United States Patent

Nowotny et al.

[11] Patent Number: 6,158,315
[45] Date of Patent: Dec. 12, 2000

[54] METHOD, DEVICE AND CUTTING TOOL FOR PRODUCING INDIVIDUAL PIECES OF DOUGH FROM A CONTINUOUS LINE OF DOUGH

[75] Inventors: Klaus Nowotny, Markt Einersheim; Udo Bernhardt, Iphofen, both of Germany

[73] Assignee: A. Fritsch GmbH & Co. KG, Markt Einersheim, Germany

[21] Appl. No.: 09/194,713

[22] PCT Filed: Mar. 18, 1998

[86] PCT No.: PCT/EP98/01592

§ 371 Date: Dec. 16, 1998

§ 102(e) Date: Dec. 16, 1998

[87] PCT Pub. No.: WO98/47378

PCT Pub. Date: Oct. 29, 1998

[30] Foreign Application Priority Data

Apr. 18, 1997 [DE] Germany .............................. 197 16 159
May 16, 1997 [DE] Germany .............................. 197 20 689

[51] Int. Cl.[7] ...................................................... B26D 7/06
[52] U.S. Cl. .................................. 83/23; 83/36; 83/76.1; 83/102; 83/155.1; 83/218; 83/932; 99/450.1
[58] Field of Search ..................................... 83/23, 34–36, 83/102, 155.1, 76.1, 215, 218, 932; 99/450.1

[56] References Cited

U.S. PATENT DOCUMENTS

| | | | |
|---|---|---|---|
| 4,703,679 | 11/1987 | Hayashi et al. | 83/102 |
| 4,832,180 | 5/1989 | Ferrero | 198/468.3 |
| 5,142,956 | 9/1992 | Ueno et al. | 83/102 |
| 5,365,816 | 11/1994 | Rudy | 83/177 |
| 5,460,081 | 10/1995 | Ueno et al. | 99/450.1 X |

FOREIGN PATENT DOCUMENTS

| | | | |
|---|---|---|---|
| 0382105 | 8/1990 | European Pat. Off. | A21C 3/06 |
| 0482917 | 4/1992 | European Pat. Off. | |

*Primary Examiner*—M. Rachuba
*Attorney, Agent, or Firm*—Pandiscio & Pandiscio

[57] ABSTRACT

Method for producing individual dough pieces from a continuous line of dough, in which a row of separate, individually complete contours running diagonally or perpendicular to the longitudinal direction of the line is cut out of the end section of the line of dough, which correspond to the dough pieces, these contours or dough pieces lying in a row next to one another are removed from the end of the line and delivered rotated or pivoted or otherwise positioned for further processing, with the cutting devices that are used to cut out the row of dough pieces at the end of the line being used as a whole or in part to remove and deliver or otherwise position, guide, hold, rotate, and/or displace the cut-out dough pieces, and with the cutting devices being returned to the end of the line after delivery for another cutting-out process.

27 Claims, 9 Drawing Sheets

METHOD, DEVICE AND CUTTING TOOL FOR PRODUCING INDIVIDUAL PIECES OF DOUGH FROM A CONTINUOUS LINE OF DOUGH

This invention relates to the production of individual dough pieces from a continuous line of dough, by cutting a series of separate self-contained contours diagonal or transverse to the running direction of the line, which correspond to the dough pieces, removing these contours or dough pieces that are next to one another in a row from the end of the line and delivering them rotated or pivoted them or otherwise positioned for further processing. The invention also relates to a device for individually isolating dough pieces from a continuous line of dough that is suitable for implementing the method described and has the following components: a punching tool, or other cutting tool, that has the dough piece contours and is operated and/or actuated by drive means, a bed opposite this for holding, supporting, or depositing the line of dough and the dough pieces cut from it by the punching or cutting tool, and control means acting with the drive means for coordinating the device components, including the punching or cutting tool that are to be actuated or driven.

Such methods and devices are used for cutting dough to size for certain bakery products that are rolled up from dough pieces, particularly croissants. Equilateral triangles are always cut out from the line of dough for these in such a way that no residues are left (for example, refer to EP 0 382 105 A1). This means that the bases of the equilateral triangles always have to be parallel to the direction of transport of the line of dough. Of course, to roll up the dough pieces the triangle base always has to point forward in the direction of transport. For this reason, machines are needed that bring the triangular dough piece on the conveyor belt into the mentioned desired position.

In this respect so-called "automatic right-angle croissant machines" are known, which are machines that cut triangles out of the line of dough and draw the cut triangles apart from one another by differential speeds of successively placed conveyor belts. They are then transferred in formation to other conveyor belts that are placed at right angles to the preceding conveyor belts. Actually, this saves using expensive spreading and turning devices for the dough pieces. However, it is a drawback that the direction of transport has to be diverted by 90° (for example, when additional operations are to be performed directly on a freezer shelf). It is also a drawback that because of the position of the base side of the punched-out triangle, a right-angle apparatus is needed on both the left and the right side of the machine. When using only one rolling-up apparatus, the punched-out dough blank has to be turned, with both a set of dough pieces with a dry top and a set of dough pieces with a wet top running into the rolling-up apparatus in each case.

In croissant-making machines of the type described initially, so-called "automatic straight-line croissant machines," dough pieces are also cut out in a special cutting station and delivered to a conveyor belt for further processing (cf. EP 0 382 105 A1). The cut-out dough pieces are "spread" apart from one another, i.e., they are moved away from one another perpendicular to the conveyor direction, to make space to rotate them. The dough pieces are separated and rotated by means of grippers in a plane parallel to the top of the conveyor belt. The dough pieces in this case are always transported straight ahead and in line. The gripper and pickup devices for spreading and rotating require a large number of drive motors, which increases the cost of structural components and of control software. Added to this are the cutting stations, for which special punching devices or rotary dies are needed, along with associated drives.

It is common to both of the known systems that the dough piece after punching/cutting still remains on the line of dough for a relatively long time before it is moved away from the line of dough by transport/spreading means. Because of this, the cut surfaces can stick together again, especially with certain doughs.

The underlying objective of this invention is to provide a method for the in-line transport of dough and a device for cutting dough pieces out of continuous lines of dough, and for depositing the cut-out dough pieces in proper orientation for further processing, while avoiding the aforementioned drawbacks, for which a small number of functional and structural components and a low manufacturing and engineering expense is necessary, particularly with regard to dough piece guidance. The dough pieces are also to be prevented from sticking to one another immediately after being cut.

As the solution, it is proposed by the invention, in a method with the features described at the outset, that the cutting means used to cut out the rows of dough pieces at the end of the line be used to remove, turn and deposit or otherwise position, guide, hold and/or shift the cut-out dough pieces, and that after the deposition the cutting means be returned for cutting out new dough pieces at the front end of the line. According to the invention, therefore, the one or more cutting means, whether it/they be a set of cutting contours, for example in the form of a punching tool, is/are used not only to cut out the dough pieces, but also for transporting, shifting, and moving the cut-out dough blanks. Costly spreading and turning devices with automatic gripping systems are thereby made unnecessary. In particular, when each of one or more punching tools, preferably with an elongated top part, is used according to one embodiment of the invention, which has one or more cutting sections producing the contours to produce the row of dough pieces, this set of dough pieces can be held, guided, and shifted between the cutting elements of the top part of the punching tool. An elongated form is expedient for the top part because several cutting sections, each with a dough piece contour, can then also be lined up in succession in the direction of transport. It is advantageous to this end, immediately after the cutting or punching of the dough pieces in the end of the line of dough, for the pressure on the top part of the punching tool against its bed to be reduced to the point that the top part with its cutters can slide on the surface of the bed and/or can be moved over it. In this way the cut-out set of dough pieces or even a single dough piece can be removed from the end of the line of dough along a surface or a face, rotated, or otherwise positioned especially easily with a single cutter.

According to one embodiment of the invention, the dough piece contour is produced by a sequential cutting method: A stationary punch or cutting device installed before the movable cutting means or punching tools cuts the base, for example, of an equilateral triangular dough piece contour, while the sides are cut by the cutting means used to move the dough pieces. In sequential cutting tools it is desirable for the dough piece also to be gripped by pickers, since the contour of the cutting tool is not a closed loop.

In the context of one embodiment of the invention, the punching or cutting tool does not have to be rotated to move the dough pieces forward. For example with rectangular, square, or round products for which rotation would not make any sense, only a linear forward motion is sufficient.

The throughput of cut-out and oriented dough pieces can be increased according to an embodiment of the method of the invention, if as many cutting means as possible, each with a cutting contour for the shape of the dough pieces, are arranged side by side and/or in succession in the end region of the line of dough in the direction of transport and are operated and moved in synchronism and/or coordinated with one another as a set or individually. This concept can expediently be put to practice by the elongated form of the top part of the punching tool described above, wherein several cutting means can be lined up with one another as a single component.

The task of the invention described above can be accomplished with the method described initially according to an alternative invention or according to an additional development of the method invention explained so far, by leaving the dough pieces after they are cut out in their position and/or in their set or row, and removing this set or arrangement of dough pieces as a whole from the end of the line, rotating it, and then depositing it, by means of the cutting means, after which the cutting means are moved back to their original position at the front end of the line and are again rotated. The objective of providing in-line dough piece transport mentioned initially as desirable for generic methods is also taken into account by this, particularly in croissant manufacturing, for which equilateral triangles of dough are cut out; the base of the triangle can then be positioned as the face pointing in the direction of transport. The vertex of the triangle opposite the base in this case is turned backward opposite to the direction of dough transport.

According to a concrete embodiment of the basic general inventive concept, in the time between cutting out the dough pieces and their deposition, the cutting means carrying the cut-out dough pieces with them are first removed linearly from the end of the line and then rotated; after the dough piece is deposited, this cycle is repeated in reverse until the cutting means again arrive above the end of the line of dough. During this sequence of motions the center of rotation or the axis of rotation of the set of cutting means moves away from the end of the line of dough and back again.

Within the scope of the invention the dough pieces can have any shape. In practice, however, in connection with croissant manufacture, the contours of an equilateral triangle, or of a trapezoid, that are symmetrical with respect to a central axis are usually used. Because of the requirement of no residual dough being left, as is known by itself (cf. EP 0 382 105 A1), the dough pieces in the form of an equilateral triangle, or of a symmetrical trapezoid, are cut out at the end of the line of dough in such a way that the end of the line of dough has a sawtooth shape. In this regard, an embodiment of the method of the invention is expedient in which the cutting means is/are optionally rotated together as a set by 180° in alternating directions between each dough-cutting process. This makes it possible for the cutting contours of the cutting tools each time to match the sawtooth-shaped end of the line of dough which is reformed corresponding to a 180° phase shift or an axial mirror image after each cutting process.

To solve the problem described above, it is proposed for a device with the features described at the outset that a guidance mechanism for the punching or cutting tool be provided that is coupled with the drive and/or control mechanism and runs parallel to the top of the bench so that the punching or cutting tool can slide with the cut-out dough pieces on and/or along the top of the bench and can be removed from the end of the line of dough and can be rotated or pivoted. These motions occur in a plane parallel to the benchtop and perpendicular to or diagonal to the direction of cutting. The benefits mentioned above for the method of the invention apply here correspondingly. In particular, the punching or cutting tools that are necessary anyhow are utilized not only for the actual purpose of cutting out dough pieces, but also to transport and orient them. This obviates the placement of separate additional functional components, such as grippers. Furthermore, the freshly cut dough pieces can be moved promptly away from the end of the line of dough before they stick together.

To increase the transport and sliding capability and to reduce wear and mechanical damage, according to an embodiment of the device pursuant to the invention, it is provided that the drive mechanism has a pressure or actuating device directed toward the line of dough and a return device directed opposite to it or counteracting it, to which each cutting element of the punching or cutting tool is connected. The return path triggered by the return mechanism for the cutting elements in this case is designed so that the cutting elements exit positive engagement with the benchtop but the punching or cutting tool with the cut-out dough pieces remains in frictional engagement and/or sliding contact with the benchtop. This guarantees that the dough pieces can always be held, guided, and shifted between the punching and cutting tool and the benchtop (which in the case of punching is the punch bed).

A guidance mechanism structure for the punching or cutting tool corresponding to or matching the method of the invention consists of providing that it has linear guidance running from the end of the line of dough in or parallel to the direction of transport to the point of deposition of the dough pieces, in which a carriage supporting the punching or cutting tool is mounted so that it can move back and forth. In or on the carriage there is a pivot bearing to which the punching or cutting tool is attached with freedom of rotation. Correspondingly, the drive mechanism is provided with a linear drive module to move the carriage and a rotary drive module to rotate the punching or cutting tool to orient the dough pieces to be delivered; these modules are coupled to the control means to coordinate and/or synchronize them with one another and/or with any means of conveyance of the dough pieces or of the line of dough.

To economize on drive components, the rotary drive module is advantageously of passive design, with such a configuration that it is set into rotation around the axis of rotation of the rotary bearing by the linear drive and/or by the carriage driven by it by driver elements. On the other hand, it is conceivable to provide separate drive units for the rotary drive also, as for the linear drive, for example an electric rotation motor. In such a case an electric linear motor would be suitable as the linear drive because both electric motors could then be managed and/or regulated by the control mechanism through a common communication system.

The solution of the problem of the invention described above is also assisted by a punching tool that can be combined with the addressed device of the invention, which is distinguished by a first and a second mounting plate as the basic structure, which are connected so that they can be shifted back and forth relative to one another in the direction of the punch stroke. The first mounting plate carries the cutting elements with the knives constituting and producing the dough piece contour, and the second mounting plate is provided with elements for ejecting dough and/or holding it in place on or between the cutting elements. For this purpose the dough-ejecting and/or retaining elements are positioned directly next to the cutting elements and/or so that they can slide on them, with a displacement stroke that is extended on both sides of the knives. With this two-part, inherently adjustable basic structure of the punching tool, the ejecting and/or retaining elements can be used for reliable deposition of the dough pieces and for dough-free return of the cutting elements to the front end of the line of dough.

Further details, features, and benefits based on the invention are found in the claims and in the following description of a preferred example of embodiment of the invention, with reference to the drawings. The drawings show:

Figure 1:
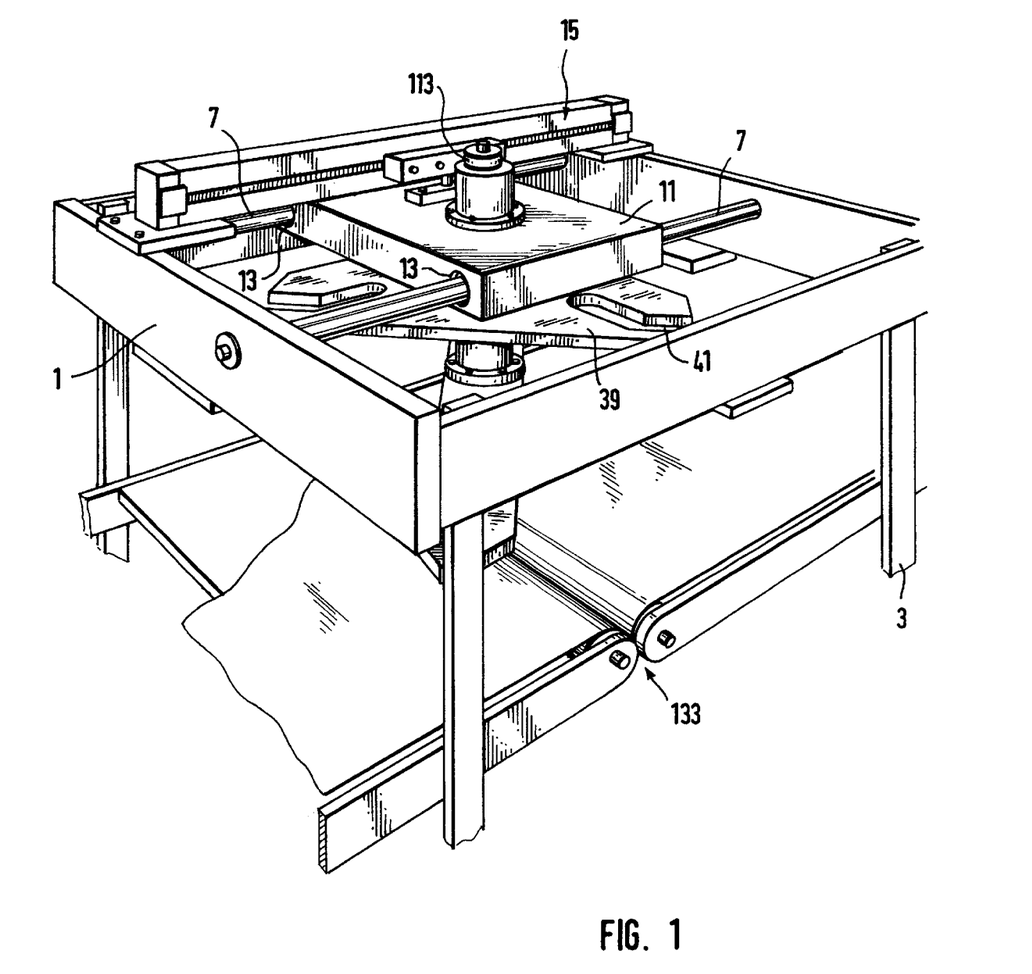
FIG. 1 A perspective side view of the machine pursuant to the invention for punching out, rotating, and positioning cut-out dough triangles with machine frame, linear guidance system in the upper area, carriage guided in it, etc.
Figure 2:
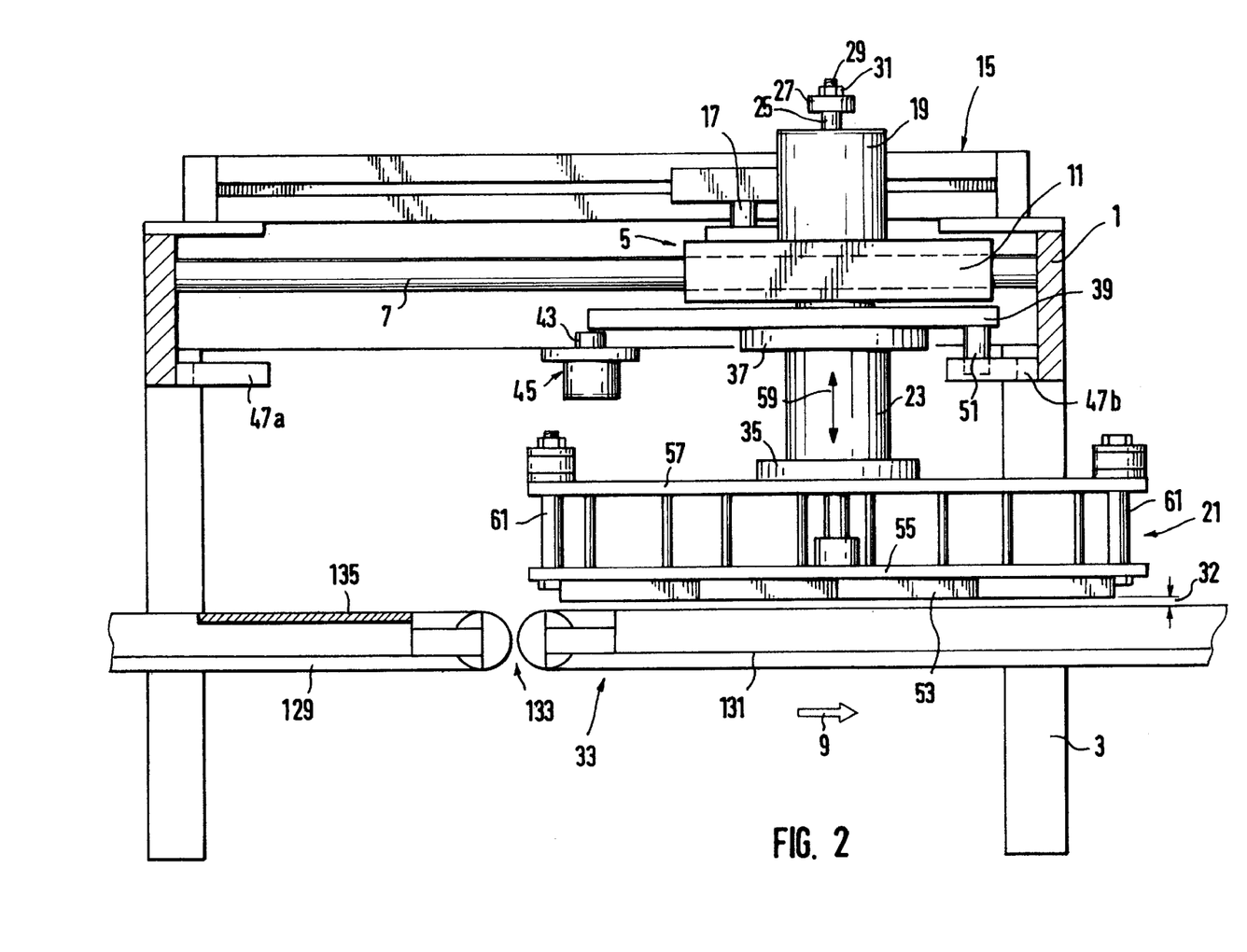
FIG. 2 The machine pursuant to the invention in side view.

In FIGS. 1 and 2, the frame 1 of the machine pursuant to the invention for combined punching and positioning of dough pieces is supported by a stand 3 on the floor or in a machine foundation. A linear guide 5 with a guide rod 7 that extends parallel to the direction of transport of the dough and to the side of the machine is built into the upper part of the machine frame 1. A carriage 11 that can shift in the direction or opposite to the direction of dough transport 9 is mounted on the guide rod 7; in the practical example of embodiment two guide rods 7 pass through the carriage 11 through guide bores 13 passing through it. A ball-type shaft bushing, known for itself, can be used to guide the carriage.

A pneumatic cylinder 15 that has no piston rod in the practical example of embodiment, is located above the carriage 11 and is supported against the machine frame 1 as the linear drive mechanism for the cylinder. Its stroke extends parallel to the guide rod 7 of the carriage linear guide 5. The pneumatic cylinder 15 is controlled and/or actuated at the proper time by a master control (not shown) to move the carriage 11 in the direction or opposite to the direction of dough transport 9 by drive pins 17 that are fastened both to the pneumatic cylinder 15 and to the carriage 11 perpendicular to their guideways.

Alternatively, the linear guidance system can also consist of a reversible three-phase electric drive that drives the carriage through a toothed belt. In this case, for example, the carriage drive can be designed as a profiled rail guide.

In FIGS. 1 and 2, another pneumatic cylinder 19 is attached to the top of the carriage 11 to impress the punching stroke for a punching tool 21 and to the bottom of the tool mount 23 to support and hold the punching tool 21. A damping plate 27 (a rubber damping spring 113 in FIG. 1) is mounted on the upper face of the punching stroke pneumatic cylinder 19 at the top of a center bar 25 that passes through. In combination with an adjusting nut 31 screwed from the top onto outer threads 29 extending from the face of the center bar 25, it can be used as a back support to adjust the distance 32 of the cutting elements of the punching tool 21 from the punch bed 33. The punching tool 21 can be fastened to the bottom of the tool mount 23 by a quick-change device 35 (shown schematically). This allows the user to react flexibly to desired dough piece shapes by changing the punching tool using the appropriate form. A turntable 39 is fastened to the top of the cylindrical tool mount through a radial extension 37. As will be described in detail below, turning motion cycles for the punching tool can be derived from the linear drive 15 in combination with the linear guide 5, which are accomplished by specifically matched guide tracks embossed in or cut out of the turntable 39, depending on the desired dough shape. In the concrete example of embodiment this is accomplished by two guidance cutouts 41 placed symmetrically to the center of rotation of the turntable 39 into which piston rods 43 of two oppositely positioned pneumatic cylinders 45 in the machine frame 1 are inserted at a given time (see below), at a definite time determined by the control mechanism (not shown). By this means the turntable 39, when it is entrained linearly by the carriage 11, is set into rotation around its axis of rotation at the same time, which is also transmitted to the punching tool 21.

Figure 3:
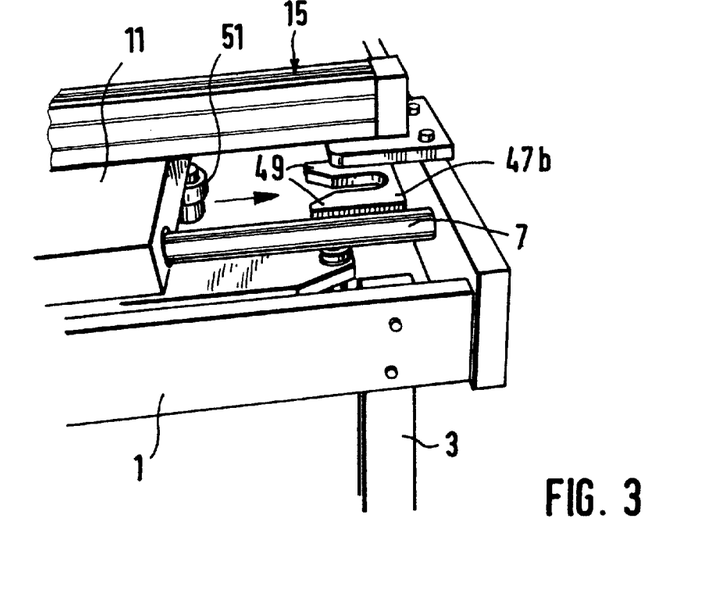
FIG. 3 A perspective end view of the front end area of the machine with centering bracket.

In FIG. 2, centering brackets 47*a*, 47*b* are fastened to the inside walls at the front and rear dead points of the motion stroke of the carriage 11 and to the front and rear ends of the machine frame 1, as is shown more clearly in FIG. 3. In the position shown in FIG. 2, a centering pin 51 is pushed in between two prongs 49 of the centering bracket 47*b* for the forward dead point of the carriage stroke in the direction of dough transport 9, so that the tool mount 23 is guided and positioned in or parallel to the direction of transport in the forward dough piece delivery position. The same applies to the rear centering bracket 47*a* in connection with centering and holding the tool mount 23 in the punching position. The centering pins 51 for the two centering brackets 47*a*, 47*b* are each fastened to the bottom of the turntable 39. The forward centering bracket 47*b* positions the tool mount so that the longitudinal direction of the punching tool 21 runs parallel to the direction of dough transport 9, whereas during the centering by the rear centering bracket 47*a* the tool mount 23, together with the punching tool 21, is rotated by 90° for the punching position, with the longitudinal direction running perpendicular to the direction of dough transport 9 (see also below).

Figure 4:
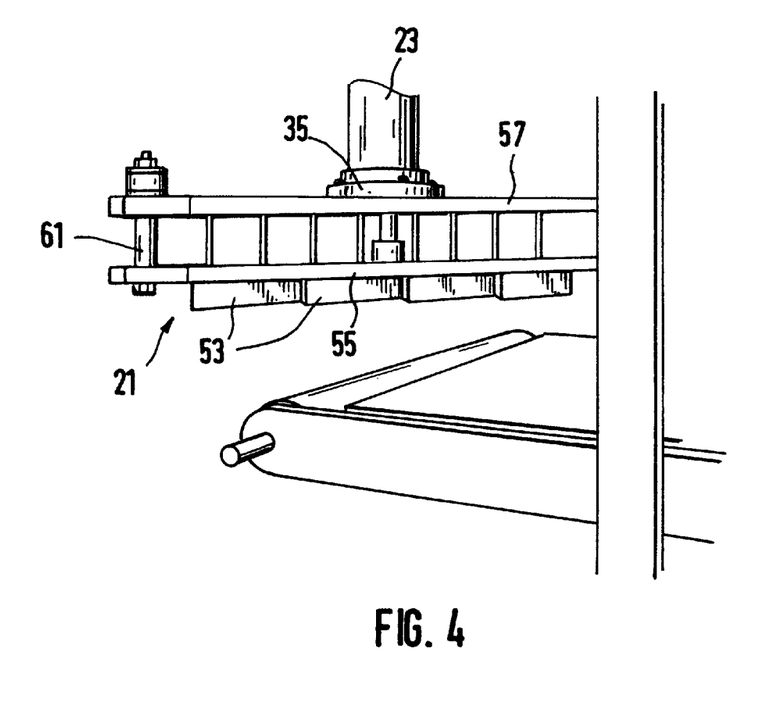
FIG. 4 A perspective side view of the bottom part of the machine with punching tool.

In FIGS. 2 and 4, the punching tool 21 is split into a mounting plate 55 carrying knife blades 53 on the bottom and a base plate 57 above it with the quick-change device 35 on the top toward the tool mount 23. As seen in more detail in FIG. 5, the mounting plate 55 is designed to move relative to the base plate 57 in the direction of a punching stroke 59 by means of guide posts 61 on the two longitudinal sides of the punching tool 21. The guide posts 61 are rigidly fixed to the top of the mounting plate 55 and pass through guide bores 63 on the two longitudinal sides of the base plate 57.

Figure 5:
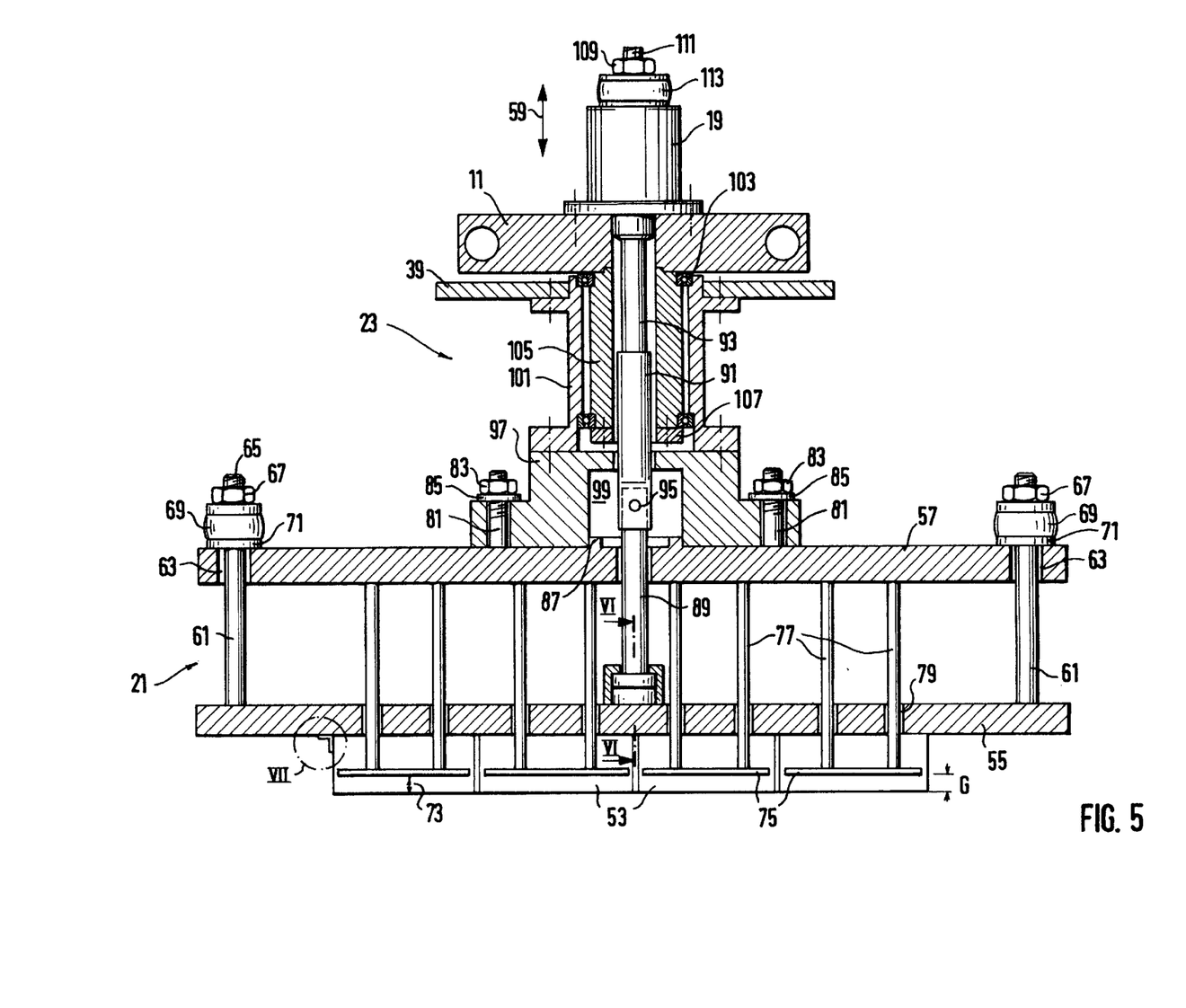
FIG. 5 The arrangement of the punching tool, tool support, and carriage in the machine pursuant to the invention.

The guide posts 61 end at the top in projections 65 with outside threads, onto each of which is threaded an adjusting nut 67. An elastomeric spring 69 encircling the guide post 61 can be tightened by this and the corresponding spring excursion can be adjusted. Shim washers 71 are attached to the top and bottom faces of the elastomeric spring 69. By adjusting the spring excursion by means of the adjusting nut 67, the back stroke of the mounting plate 55 can be adjusted so that the punching stroke pneumatic cylinder 19 is returned upon completion of the punching process. The elastomeric spring 69 is preferably made of polyurethane and the two shim washers 71 between the faces of the elastomeric springs on the one hand and the adjusting nut 67 and the top of the base plate on the other hand serve to better distribute the pressure from the adjusting nut 67 and the spring elements 69. When the punching stroke pneumatic cylinder 19 is put into a pressure-free state immediately after cutting the line of dough into dough pieces, the elastomeric springs 69 can press the mounting plate 55 upward toward the base plate 57 into a position in which the punching tool 21 with the cut-out dough pieces can slide over the punch bed 33.

FIG. 5 shows the punching tool 21 in the punching position, i.e., the knife blades 53 extend by a sufficient distance 73 beyond hold-down plates 75, for example made of plastic, which are fastened to the bottoms of guide rods 77, and each of which extends between the insides of the knife blades 53 facing one another that reflect the dough piece contours. At the other end the guide rods 77 are rigidly fastened to the bottom of the base plate 57, and from there they pass through the mounting plate 55 in guide bores 79 down to the hold-down plates 75 at the bottom, which serve to hold the cut-out dough pieces during their transport on the punch bed 33 and the stripping and ejection of the dough pieces in the oriented delivery position (see below). With this arrangement the knife blades 53 and the hold-down plates 75 can move up and down relative to one another. When the knife blades 53 are moved upward by a distance G from corresponding control or actuation of the punching stroke pneumatic cylinder 19, particles of dough pieces located or even stuck between the knife blades 53 can be stripped away. To change products, the punching tool 21 is mounted so that it can be removed from the tool mount 23 through the quick-change device 35 (see FIG. 2 or 4). Guide pins 81 extending upward from both sides of the top of the base plate 57 of the tool mount 23 serve to guide the punching tool 21 in complementary longitudinal holes in the tool mount 23 (not shown). The height of the guide pins 81 is slightly smaller than the wall thickness in the corresponding socket of the tool mount 23, so that the base plate 57 can be tightened and fastened against the tool mount 23 by means of a screw or nut element 83. When pushed into the tool mount 23, the punching tool 21 is held by lock washers 85 just below the face of the screw nut element 83. A connecting rod 89 of the punching tool extends upward to a connecting piece 91 of a piston rod 93 of the pneumatic stroke cylinder 19 inside a centering collar 87 designed as an annular projection that guarantees the exactly centered position of the punching tool 21 in the tool mount 23. The connection between the piston rod connecting piece 91 and the connecting rod 89 of the punching tool 21 can be brought about by means of a set screw connection 95 (indicated schematically).

In FIG. 5, the tool mount 23 has a screw block 97 encircling the centering collar 87 that rests on the top of the base plate 57 of the punching tool 21 and is connected to it with bolted connection 83 through the guide pins 81. The connecting rod 89 and a connecting piece 91 of the piston rod 93 are contained in a fastener cavity 99 that is made inside the screw block 97. It can be designed as a slot through the casing of which the punching tool 21 is attached centered by means of the centering collar 87. The screw block 97 is connected to a rotary jacket 101, for example bolted to it, which is mounted through pivot bearings 103 to rotate with respect to an inner bushing 105. The top face of the inner bushing 105 is solidly connected to the bottom of the carriage 11, for example bolted to it. The rotary jacket 101 is connected at the top to the bottom of the turntable 39, for example bolted to it. In this way the turntable 39, when it derives its rotation from the linear drive system, can transmit it to the tool mount 23 and its screw block 97. With respect to the rotary jacket 101 set in rotation by the turntable 39, the core of the tool mount 23, the inner bushing 105, remains at rest, since the torque cannot be transmitted because of the pivot bearing 103 installed at the top and bottom of the inner bushing 105. The inner bushing 105 is secured against axial motion by a lock washer 107 at the bottom face that encircles the piston rod connecting piece 91. The punching stroke pneumatic cylinder 19 is mounted on the carriage 11 to bring about punching motions of the mounting plate 55 with the knife blades 53. The depth of punching can be adjusted by means of a cylinder adjustment nut 109 that is screwed onto an outside thread projection 111, the front of which projects from the top of the pneumatic punching stroke cylinder 19. A rubber spring 113 located directly on the bottom face of the cylinder adjustment nut 109 serves to damp the motion when traveling into the end position.

Figure 6:
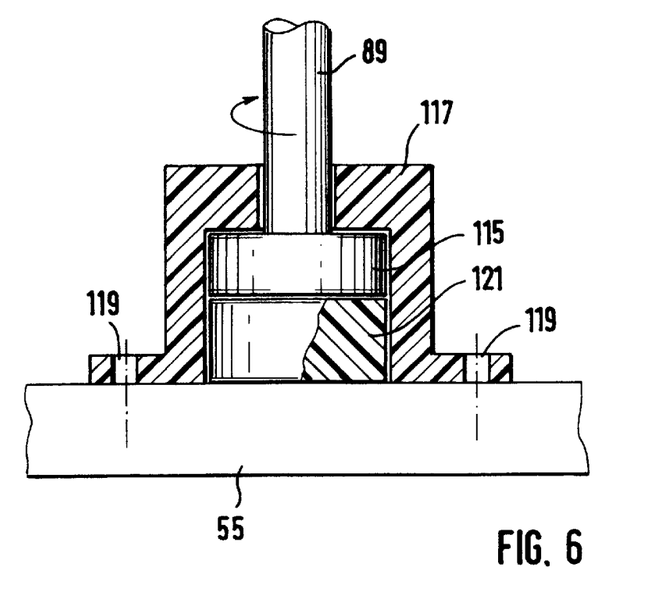
FIG. 6 A cutaway view along the line VI—VI in FIG. 5.

For the rotary motion of the rotary jacket 101 of the tool mount 23 along with that of the screw block 97 not to be transmitted to the piston rod 93 and its connecting piece 91 of the pneumatic punching cylinder 19, according to FIG. 6 the connecting rod 89 of the punching tool 21, which has a ram-shaped extension 115 at the bottom, is contained with it and mounted to rotate in a plastic case 117. The latter is fastened with bolts to the top of the mounting plate 55, for example through bolt holes 119. Inside the plastic case 117 and just below the bottom of the ram extension 115 there is a friction bearing plate 121 that serves to transmit the axial force from the pneumatic punching stroke cylinder 19 to the mounting plate 55 of the punching tool 21. Like the case 117, the latter is made of plastic in particular for reasons of acoustic damping and friction. The base plate 57 of the punching tool 21 is solidly connected by bolt connection 81, 83, 85 to the rotary part 97, 101 of the tool mount 23. The mounting plate 55 that may be rotating can be moved up and down by the pneumatic punching stroke cylinder 19 decoupled from the rotation, with the posts 61 in the guide bores 63 in the base plate 57 being correspondingly raised or lowered with it.

Figure 7:
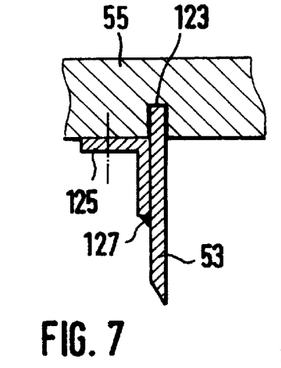
FIG. 7 The detail VII from FIG. 5 in enlarged illustration.

FIG. 7 shows an enlarged view of the fastening of the knife blade 53 in a milled-in knife-receiving groove 123. A fastening bracket 125 that is L-shaped in profile is used for fastening and stabilization, with the outsides of its two L arms being both bolted to the bottom of the mounting plate 55 and fixed by a welded seam 127 to the inner wall of the knife blade 53.

Figure 8:
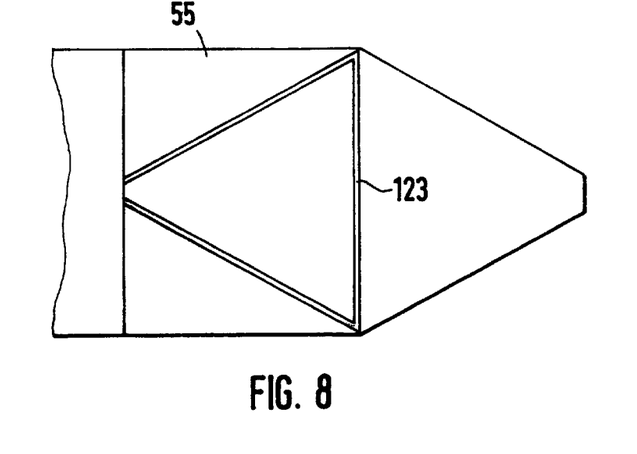
FIG. 8 A view of the cutting plate of the punching tool on the bottom without knife blades.

FIG. 8 shows a view with and without knife blade removed, with the receiving groove 123 milled into the bottom of the mounting plate 55 with its contour of an equilateral triangle corresponding to the cut-out dough piece—being clearly visible. This knife-receiving groove 123 at the same time is relevant as an insertion template for all knife blades, which have to be symmetrical to one another with the greatest possible precision.

According to FIGS. 1 and 2, the punch bed 33 is located beneath the machine frame 1; in the concrete example of embodiment it is realized as a first infeed conveyor belt bed 129 and a second takeaway conveyor belt bed 131. The dough pieces are cut or punched out of the continuous line of dough on the first conveyor belt bed 129. To accomplish this, at least the first conveyor belt bed 129 is provided with a cut-resistant surface. The second conveyor belt bed 131 is used for delivering the dough pieces from the punching tool 21, which have been transported and/or shifted downstream in the transport direction 9 by means of the punching tool 21 from the first conveyor belt bed over a joint bump or gap 133 between the two beds 129, 131 to the second conveyor belt bed 131. After ejection of the dough pieces and the return travel of the punching tool 21, the second conveyor belt bed 131 feeds the dough pieces to a rolling-up unit. In FIG. 2 the first conveyor belt infeed bed 129 is used with a reinforced cutting bed 135 and is covered with an elastomeric plate that series as a backing or punching tool bed for the knife blades 53 and provides for adequate evenness and elasticity of the backing.

The process of the invention will be explained below in connection with the functional method of the device.

Figure 9:
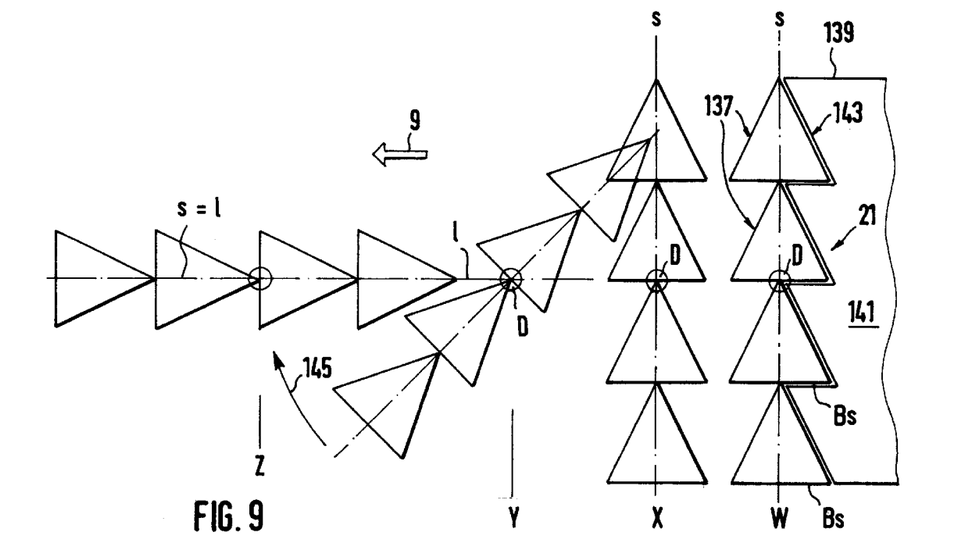
FIG. 9 A top view of the dough piece/cutting tool motion sequence from cutting out to the oriented delivery pursuant to the invention.
Figure 10:
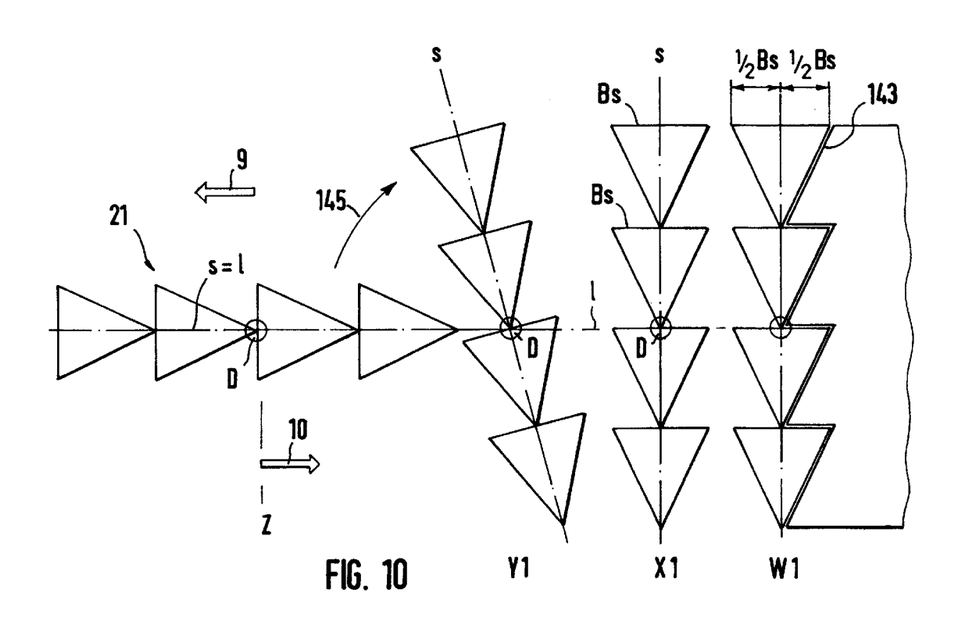
FIG. 10 A corresponding view of the dough piece/cutting tool motion sequence from delivery to the cutting-out process.

FIGS. 9 and 10 show a complete motion cycle of the cutting contour of the punching tool for the concrete application of the production of croissants from dough pieces with the contour of an equilateral triangle. In the example of embodiment shown, the punching tool has four identical cutting contours of equilateral triangles, each with the base Bs. In the position W for punching, it runs parallel to an edge 139 of the continuously fed line of dough 141 (a timed infeed is also basically possible). The axis of symmetry s of equilateral cutting contours 137 in the position W is perpendicular to edge 139 of the line of dough 141 and to the direction of dough transport 9. During the punching out of a set of equilateral triangular dough pieces, it is desirable for the conveyor belt carrying the line of dough 139 to stop briefly. After completion of the punching process the set of cutting contours 137 is first moved linearly in the direction of transport 9 until a given position X is reached in which sufficient space and distance from the remaining sawtooth-punched front edge 143 of the line of dough 141 are left. The rotation of the punching tool and of the set of cutting contours 137 can then be initiated around the center of rotation D between the two middle cut contours. Rotation occurs in the clockwise direction 145 in the example shown. With this progressing rotation, which occurs approximately in or on a plane corresponding to the line of dough 141, the linear advance motion of the punching tool 21 continues at the same time in such a way that the center of rotation moves forward steadily on a line in the direction of dough transport 9, which corresponds suitably to the centerline or central axis of the line of dough 141. Half completion of the rotational motion 145 at an angle of about 45° is illustrated as the intermediate position Y. With the continuation and completion of rotation after passing through an angle of 90° from the position W/X into the position Z for depositing the dough pieces, the center of rotation or the axis of rotation D has also been moved ahead linearly in the direction of transport 9, and the axis of symmetry s has been superimposed on the centerline of the line of dough. When the dough pieces entrained within the cutting contours 137 have been ejected at position Z by means of the hold-down plates 75 (cf. FIG. 5), the linear motion of the punching tool 21 is reversed to a direction 10 opposite to the direction of dough transport 9 (FIG. 10). With increasing return motion 10, rotation 145 of the punching tool 21 is again initiated or continued in the clockwise direction until the intermediate rotated position designated Y1 in FIG. 10 is reached. With the further motion of the punching tool 21, with the return linear motion 10 and the rotation 145 superimposed on one another, the position X1 of FIG. 10 is finally reached, which corresponds to the position X in FIG. 9. The two positions are distinguished by the fact that the axis of symmetry s of the triangle is then perpendicular to the centerline of the line of dough. During the entire motion cycle the center of rotation D of the punching tool has always moved on the centerline, first according to FIG. 9 in the direction of dough transport 9, and after deposition of the dough pieces, back in the direction opposite to dough transport 10. The base of the equilateral triangle in position X1 is again parallel to the edge 139 of the line of dough 141. Since the rotation after depositing the dough pieces in position Z has continued in the same clockwise direction 145, the punching tool 21 in position X1 has then rotated by exactly 180° compared to the corresponding position X in FIG. 9, so that the vertices of the triangles (opposite the bases Bs) in FIG. 10 point downward (while they point upward in FIG. 9). With further linear return motion 10, the cutting contours can then come to a position designated W1 in FIG. 10 superimposed on the sawtoothed front edge 143 of the line of dough 141 cut out in position W according to FIG. 9. Since the positions W, W1 of the punching tool for the punching process have to be identical, the line of dough has to have traveled a distance equal to half the length of the base Bs in the direction of dough transport 9 while the punching tool 21 passed through the positions X-Y-Z-Y1-X1-W1. With these prerequisites, the diagonal sides of the triangular cutting contours 137 facing in the direction of dough transport 9 have to come to lie superimposed and flush above the saw-toothed front edge 143 of the line of dough 141 remaining from the previous punching process for a lined-up, residue-free punching process.

Figure 11:
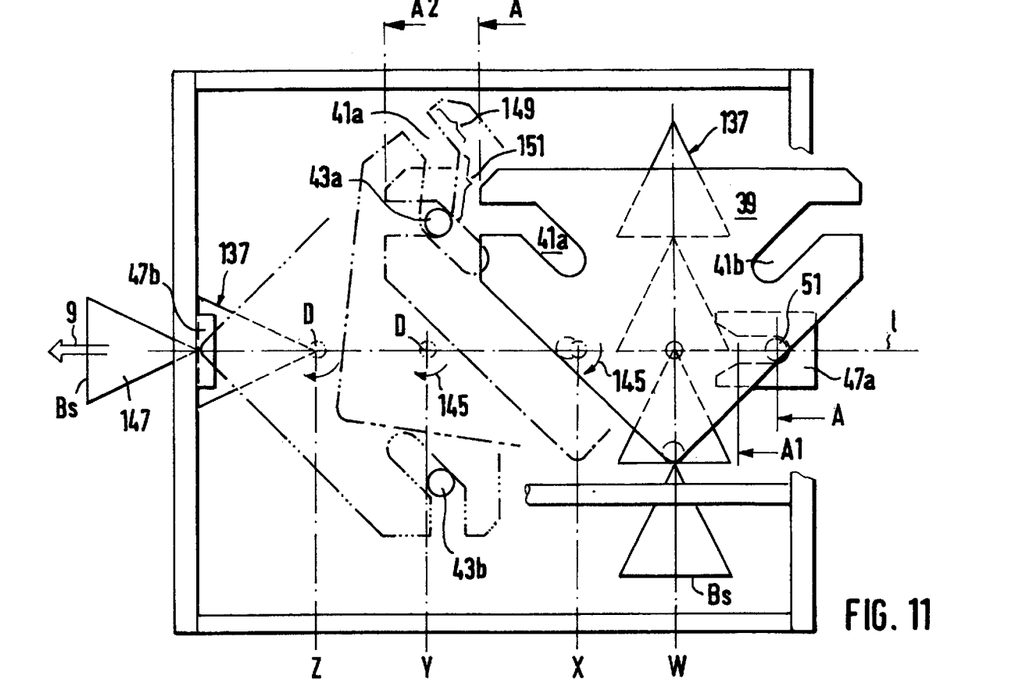
FIG. 11 The motion stages of the punching tool in the machine corresponding to FIG. 9 after cutting out in the direction of dough transport, in top view.
Figure 12:
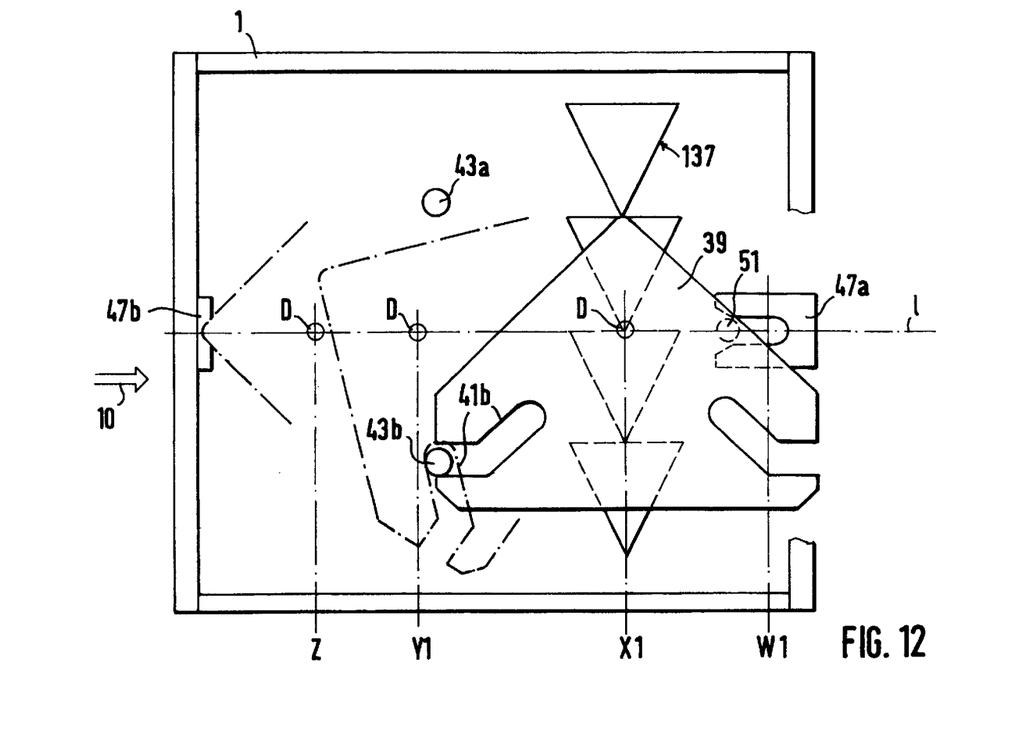
FIG. 12 The motion stages of the punching tool in the machine corresponding to FIG. 10 after depositing the dough pieces, opposite to the direction of dough transport.

FIGS. 11 and 12 show the motion cycles of the turntable 39 corresponding to the process cycles just described to regulate the punching tool 21 in the context of the process pursuant to the invention. The turntable 39, shown in top view in various stages of motion in partial cutaway illustration, is rotationally connected to the tool mount 23 and the punching tool 21 (see above), and moves and rotates them into the position W, W1 for oriented delivery. The center of rotation and the pivot bearing D are moved linearly, analogously to FIGS. 9 and 10, precisely on the centerline 1 of the line of dough to be punched out.

In FIG. 11, the set of cutting contours 137 in position W is in the punching position at the bottom of the punching tool beneath the turntable 39. The base Bs of the cutting contours 137 runs parallel to the longitudinal side and points downward in FIG. 11. In position Z for the oriented delivery of dough pieces 147, the turntable 39 and the set of cutting contours 137 have rotated 90° in the clockwise direction 145. The base Bs of the equilateral cutting contours 137 then points forward in the direction of dough transport 9; the same applies to the base Bs of the dough pieces 147, with which a following rolling-up apparatus (not shown) can then be loaded. In position W for punching out, the turntable 39 is centered precisely by the centering pin 51 in the rear centering bracket 47a so that the cutting contours 137 can punch out individual dough pieces 147 precisely, superimposed and flush with the sawtooth-shaped front edge 143 of the line of dough 141. After completion of the punching process, the carriage 11 with the turntable 39 coupled to it first moves only linearly in the direction of dough transport 9 to the position X, where the rotation 145 in the clockwise direction of the turntable 39 is initiated. The centering pin 51 provides for centered removal of the dough pieces and of the set of cutting contours from the front edge of the line of dough, as long as it is located in the rear centering bracket 47a (path A-A1). In position X, initiation of the rotation 145 of the turntable 39 is possible. For this purpose, after position X is reported to the control means, it directs the appropriate turntable pneumatic cylinder 45 in such a way that the piston rod 43a on the right in the direction of transport 9 is extended and can become engaged with the corresponding guidance cutout 41a of the turntable 39. After traversing the path A-A1, the piston rod 43a on the right in FIG. 11 is located directly at the entry to the guidance cutout 41a on the right, which has a first initial section 149 and a second terminal section 151 at an angle to it. The piston 43a on the right of the centerline in the direction of transport 9, with increasing linear displacement, imparts to the turntable 39 a clockwise rotation 145, namely after reaching position A2. In this position, the piston rod 43a is at the edge of the second, rear terminal section 151 of the guidance cutout 41. With further linear displacement of the carriage 11 in the direction of transport 9 and of the turntable 39, the clockwise rotation 145 is continued until an angle of rotation of 90° is completed. This is detected by a sensor (not shown) and reported to control means, which thereupon directs the appropriate pneumatic cylinder 45 so that the corresponding piston rod 43a is withdrawn. The front centering bracket 47b in the direction of transport 9 then assumes the guidance of the turntable 39 and holds it so that the punching tool 21 with the set of cutting contours 137 comes to a centered delivery position of the dough pieces 147 with their bases Bs pointing forward.

When the dough pieces 147 have been deposited freely on the takeaway conveyor belt bed 131, according to FIG. 12 the appropriate pneumatic cylinder 45 for the piston rod 43b located to the left of the centerline in the direction of transport 9 is directed by control means in such a way that it is extended for insertion into the associated guidance cutout 41b, the second rear terminal section 151. With further, reversed linear displacement of the carriage 11 in the direction 10 opposite to dough transport, the previous clockwise rotation 145 is continued because of the engagement with the left piston rod 43b. With the superimposed simultaneous linear return motion 10, the turntable 39 thus reaches the position X1 in which the left piston rod 43b becomes disengaged from the left guidance cutout 41b and/or is retracted into the corresponding pneumatic cylinder 45. From there on, the return motion 10 is purely linear, with the centering pin 51 to the rear in the direction of dough transport 9 again meshing with the centering bracket 47a to the rear in the direction of dough transport for symmetrical centering relative to the centerline. The punching tool has then completed an overall clockwise rotational motion 145 of 180°, so that the bases of the equilateral cutting contours 137 face the other longitudinal side of the line of dough compared to the arrangement of FIG. 11. With further linear displacement, the centering pin 51 reaches a stop in the rear centering bracket 47a, with which the new punching position W1 rotated by 180° is reached. After punching out, a front edge of the line of dough is left that corresponds to the sawtooth shape in FIG. 10 that is phase-shifted by 180° relative to the sawtooth shape of the edge of the line of dough in FIG. 9.

FIGS. 9 and 10, and 11 and 12, each describe half of an operating cycle of the punching machine, and renewed linear motion out of position W1 in the direction of dough transport 9 causes reversed rotation of the turntable 39 in the counterclockwise direction, with the left piston rod 43b in the direction of dough transport 9 being extended until the delivery position is reached, and the piston rod 43a on the right in the direction of dough transport 9, of the particular pneumatic cylinder 45, then being activated for the turntable 39 for the return motion 10. The complete operating cycle is illustrated below in detail with reference to FIGS. 13a–d.

Figure 13A:
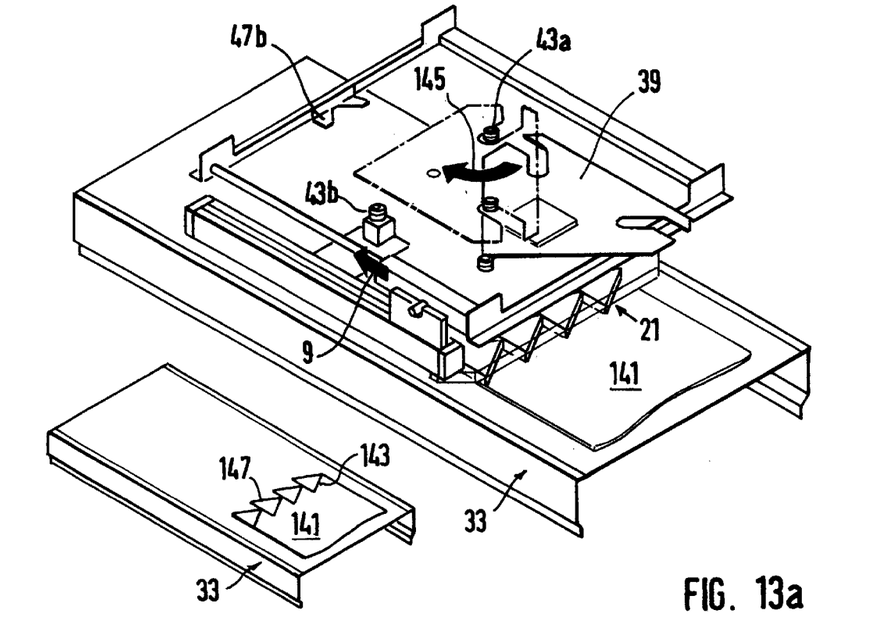
FIG. 13*a–d* The method of operation of the machine pursuant to the invention shown in perspective with the punching tool motion stages of a complete operating cycle.
Figure 13B:
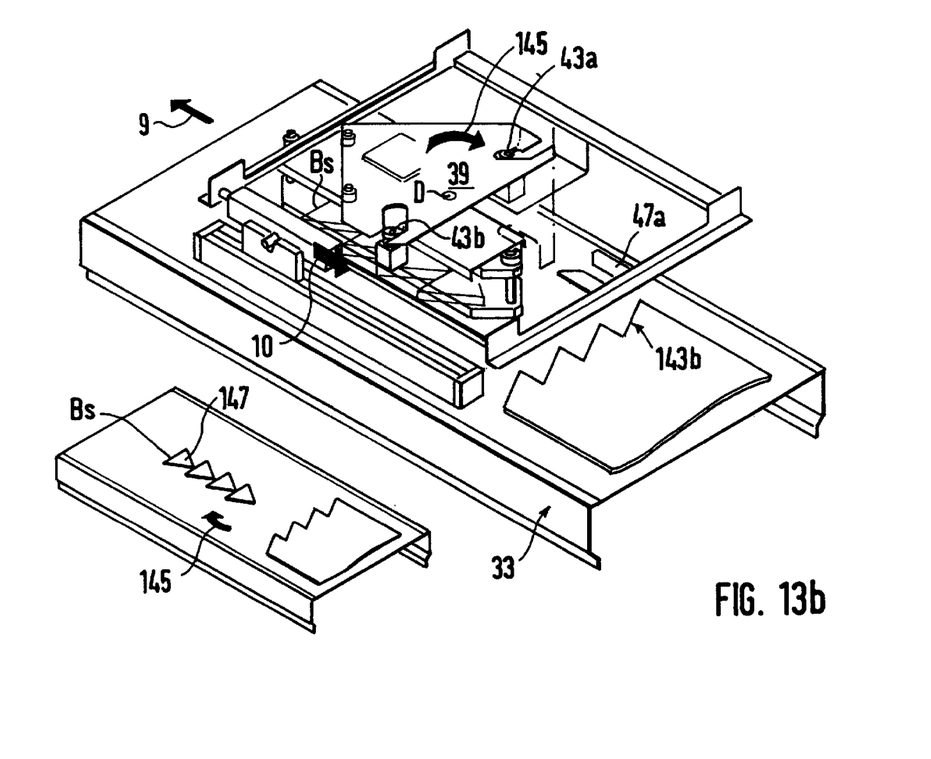

In FIG. 13a the punching tool 21 in position W (cf. FIGS. 9 and 11) waits until the line of dough 141 has been moved in the direction of advance 9 of the line of dough by half the length of the base Bs of the equilateral contour triangle. The precise position of the punching tool 21 along with the carriage 11 or turntable 39 is reached by locating it with pivot bearing D and centering pin 51. This is necessary in order to punch out the dough pieces 147 with identical contour. The punching tool rotates by 180° from punching stroke to punching stroke, which also causes absolute symmetry of the punching tool with respect to the axis of symmetry s (cf. FIGS. 9 and 10). The travel of the line of dough by half the length of the base can be detected with a meter that then issues a corresponding signal to control means, whereupon the punching stroke is triggered. Pressure is then applied to the punching stroke pneumatic cylinder 19, which presses the punching tool 21 with its cutting contours 137 and knife blades 53 through the line of dough 141. For this to be completely cut through, the punching tool bed 33 in the cutting position W, W1 is provided with a flat plate as a reinforced cutting bed 135, over which a rubber mat can be placed as a soft support. This makes it possible for the cutting edge of the knife blade 53 of the punching tool 21 to reach slightly beneath the bottom of the line of dough. After cutting, the punching stroke cylinder 19 is relieved of pressure, and the knives are withdrawn by the spring elements 69 that were stretched during the punching process, and come to a stop slightly above the punching tool bed 33. Because of this, the punching tool 21 can be fed or can slide over the surface of the bed 33, for example over a conveyor belt bed, without jamming or tilting. During the punching stroke the conveyor belt, if one is used as the punching tool bed, stands still to achieve the greatest possible accuracy of punching. The punched-out dough pieces 147 are then transported as indicated in FIG. 13a with linear direction of dough transport 9 and clockwise rotation 145. During this, they are held and guided between the knife blades 53 of the punching tool 21 and are taken out of the line of dough 141 in a motion (W-X) that initially is exclusively linear. With completion of the clockwise rotation 145 by 90°, the dough pieces 147 with their bases Bs pointing forward come to a position for further processing by a following rolling-up apparatus. This can be seen in FIG. 13b. The set of dough pieces 147 at the rear dead point in position Z of the carriage 11 is then ejected by means of the hold-down plate 75 between the knife blades 53 and is set down in orientation preferably on the takeaway conveyor belt bed 131, which feeds the dough pieces 147 to a following processing station (not shown), for example a rolling-up apparatus. The ejection motion occurs from application of pressure to the punching stroke pneumatic cylinder 19 in the opposite direction away from the surface of the line of dough. The dough pieces 147 previously located between the knife blades 53 are thereby set free of them. If residues of dough pieces still present between the knife blades 53 are also to be pulled out, the hold-down plates or stripper plates located above the dough pieces 147 strip the residues of dough pieces from the knife blades 53. In FIG. 13b the linear return motion 10 opposite to the direction of dough transport 9 is imparted to the turntable 39 after the ejection, with the turntable 39 along with the punching tool 21 being rotated 90° further in the clockwise direction. To accomplish this, the left piston rod 43b in the direction of dough transport 9 is extended to engage in the associated guidance cutout 41b, and complementary thereto, the right piston rod 43a is removed from the associated guidance cutout 41a by retraction into the associated pneumatic cylinder. In FIG. 13a in exactly the reverse manner, the right piston rod 43a is extended and the left piston rod 43b is inactive.

Figure 13C:
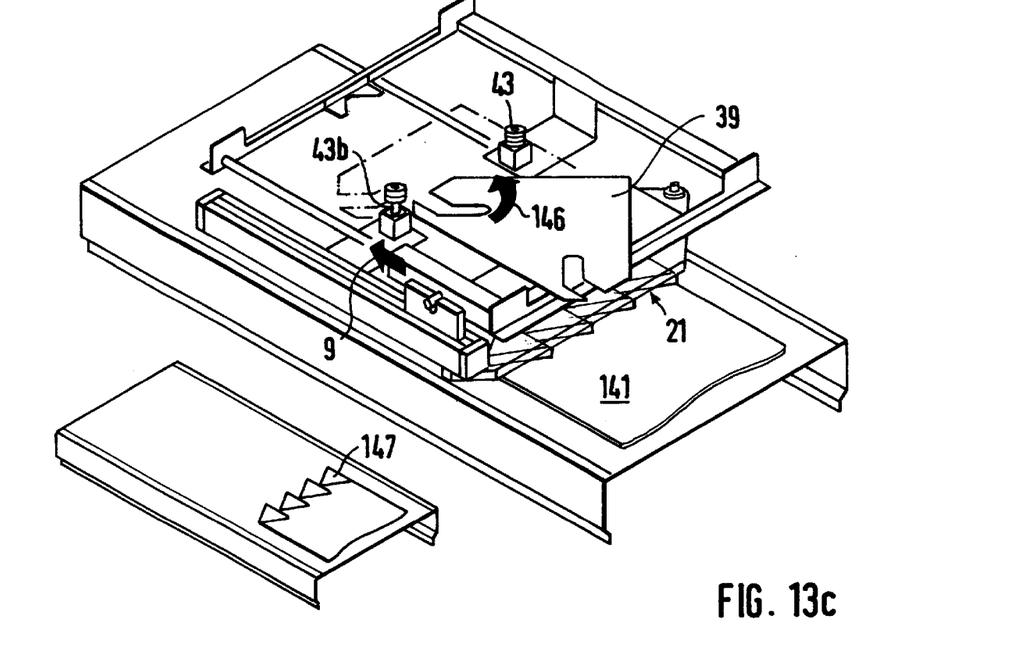
Figure 13D:
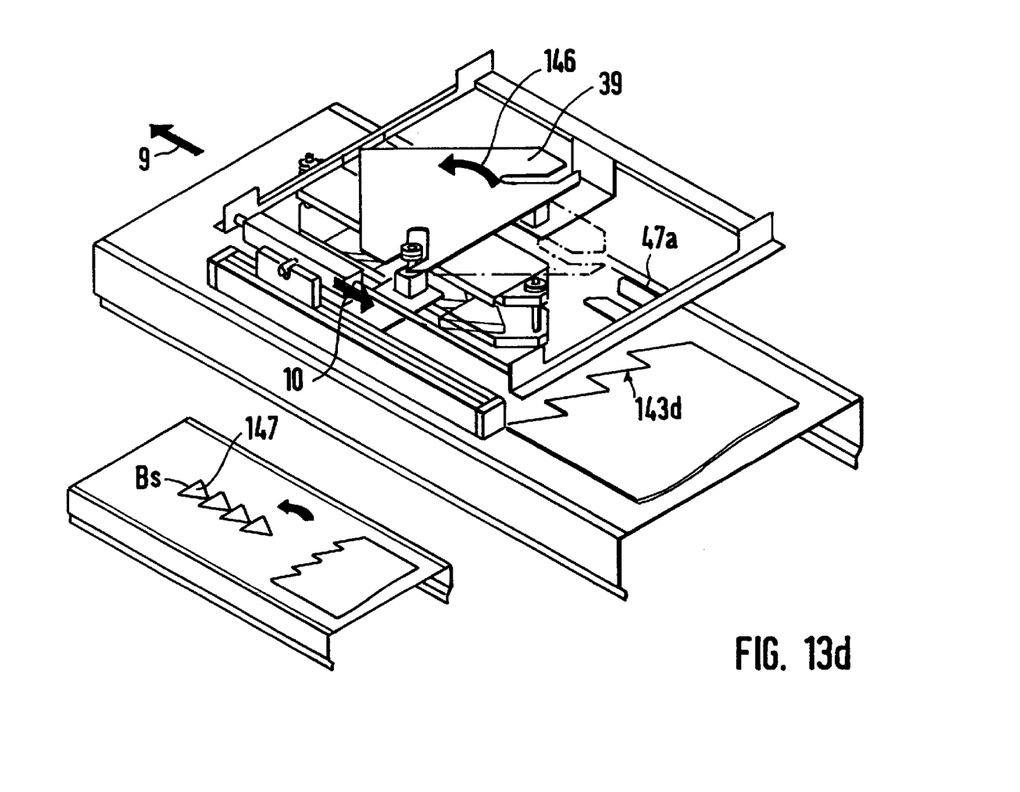

In FIG. 13c the punching tool 21 is now positioned in a position rotated by 180° from the punching position according to FIG. 13a. The base Bs of the equilateral cutting contours and dough pieces 147 in this case points toward the edge of the line on the right in the direction of dough transport 9. After the dough pieces 147 are punched out, the linear motion in the direction of dough transport 9 is initiated, with a counterclockwise rotation 146 being imparted to the turntable 39. To accomplish this, the piston rod 43b on the left in the direction of dough transport 9 is extended into the associated guidance cutout 41b. The piston rod 43a on the right is retracted into the associated pneumatic cylinder and is inactive. The further motion cycle occurs as described above, but with sides reversed by 180°. The dough pieces 147, as seen in FIG. 13d, bottom, are then likewise set down with the base Bs pointing in the direction of dough transport 9, or forward, for the further rolling-up process. The sawtooth shape of the front edge 143b of the line of dough 141 is phase-shifted by 180° from the sawtooth front edge 143b according to FIG. 13b.

What is claimed is:

1. A method for producing pieces of dough from a continuous line of dough, the method comprising the steps of:

moving the line of dough relative to a cutter to bring an end portion of the line of dough into alignment with the cutter;

moving the cutter into engagement with the line of dough end portion to cut away dough pieces from the line of dough, the cut away dough pieces lying in a row and removed from the line of dough; and moving the cutter to transport the dough pieces to a predetermined position and orientation.

2. The method in accordance with claim 1, wherein one component of the cutter is stationary and held in place for cutting a part of a dough piece, while another component of the cutter is used to move the dough piece and is further used to complete cutting of the dough piece.

3. The method in accordance with claim 1, wherein at least one punching tool (21) is used as the cutter (21, 53, 137), the punching tool being provided with a mounting plate (55, 57) that has one or more cutting sections (137) movable at least partially linearly (9) and positioned to produce the row of dough pieces (147), and to remove the dough pieces from the end portion of the line (143), with the row of dough pieces (147) being held and guided between cutting elements (53) of the punching tool mounting plate.

4. The method in accordance with claim 1, wherein at least one of a rotational and pivoting motion (145, 146) is effected upon removal (W-X) of the cut away dough pieces from the end of the line (143).

5. The method in accordance with claim 3, wherein immediately after the punching (W, W1) of the dough pieces, for the further guidance and displacement of the dough pieces (147), pressure on the punching tool mounting plate (55, 57) toward a punching tool bed (33) is relieved until the mounting plate (55, 57) with its cutting edges can slide on the surface of the punching tool bed (33) and be moved above it.

6. The method in accordance with claim 3, wherein a dough conveyor belt (129) provided with a cut-resistant surface (135) is used as a punching tool bed (33).

7. The method in accordance with claim 6, wherein the dough conveyor belt (129) is stopped during the dough piece punching process (W, W1) and is then again set in motion.

8. The method in accordance with claim 6, wherein after each punching process (W, W1), the dough conveyor belt (129) is moved in a direction of dough transport (9) through a travel distance that corresponds to a dimension of a contour of the dough piece (147) in a longitudinal direction of the line.

9. The method in accordance with claim 8 wherein the cut away dough piece (147) is provided with the form of an equilateral triangle, the base (Bs) of which runs parallel to a longitudinal direction of the line of dough, and wherein the punching of the dough pieces (147) from the line of dough (141) occurs free of residue, and wherein the travel distance corresponds to half the length of the base (Bs).

10. The method in accordance with claim 2, wherein the cutter components each produce a dough piece contour, are located proximate the end portion of the line of dough (143) and are operated and moved in synchronism and coordinated with one another.

11. A method for producing individual dough pieces from a continuous line of dough (141), in which a row of separate, individually complete dough pieces are cut out of an end section (143) of the line of dough (141) by a cutting means, the cut-away dough pieces (147) lying in a row next to one another being removed (W-X) from the end section of the line (143) and delivered for further processing, wherein the cut-way dough pieces (147) are removed as a whole from the end section of the line (143) by the cutting means (21, 53, 137) and are delivered by the cutting means, after which the cutting means (21, 53, 137) is returned and repositioned in a cutting position (W, W1) at the end section of the line (143).

12. The method in accordance with claim 11, wherein the cutting means (21) with the cut-away dough pieces (147) is oriented in parallel to a direction of transport (9) of the line of dough.

13. The method in accordance with claim 12, wherein each dough piece (147) is in the form of an equilateral triangle, the base (Bs) of which runs in a longitudinal direction of the line of dough (1), and wherein the cutting of the dough pieces (147) from the line of dough (141) occurs free of residue, wherein by a rotation (145, 146) of the cutting means (21, 53, 137) each dough piece (147) is delivered (Z) with its base (Bs) running perpendicular to the direction of dough transport (9) and facing forward in the direction of dough transport (9).

14. The method in accordance with claim 11, wherein after the dough piece is cut out (W, W1) and before the delivery (Z) of the dough piece, the cutting means (21, 53, 137) with the cut away dough pieces (147) are first removed linearly from the end section of the line (W-X) and then rotated (145, 146), and after delivering the dough piece (Z) and before cutting out the dough piece (W, W1), the cutting means (21, 53, 137) are rotated (145, 146) without the dough pieces (147) already delivered, and are then moved (10) linearly to the end of the line (143).

15. The method in accordance with claim 11, wherein a cutting contour (137) of the cutting means (21, 53, 137) and a form of the dough pieces (147) are symmetrical with respect to a central axis (s) running perpendicular to the longitudinal direction of the line, and wherein the cutting means (21, 53, 137) are rotated by a selected angle in alternating directions (145,146), between each dough-cutting process (W, W1).

16. The method in accordance with claim 11, wherein means of ejection and stripping (75) are set into combined action with cutting edges of the cutting means (21, 53, 137) to deliver (Z) the dough pieces.

17. A device for isolating dough pieces (147) from a continuous line of dough (141), the device comprising a cutting tool (21, 53, 137) having the dough piece contours and adapted to be moved by a drive mechanism (15, 19), a bench opposite said cutting tool as a support base and a bed (33) for the line of dough (141) and the dough pieces (147) cut out of it by the cutting tool (21, 53, 137), control means adapted to act on the drive mechanism (15, 19) for coordination of device components to be moved or driven, and guide means (5, D, 61) holding the cutting tool (21, 53, 137), said guide means being coupled to the drive mechanism and the control means and run parallel to the bench in such a way that the cutting tool (21, 53, 137) with the cut-out dough pieces (147) can slide and move along the bench and can be removed (W-X) from an end of the line of dough (143) and can be rotated and pivoted (145,146).

18. The device in accordance with claim 17, wherein the cutting tool (21, 53, 137) is provided with dough-ejecting and holding elements (75) that work together with cutting elements (53), and the dough-ejecting and holding elements (75) and the cutting elements (53) are adapted to be adjustable relative to one another by means of at least one of the drive mechanisms (19) and a spring element (69) to eject a dough piece (147) from between the cutting elements (53) and to strip the dough piece therefrom.

19. The device in accordance with claim 18, wherein the cutting tool (21, 53, 137) is provided with a mounting carrying the cutting elements (53), whose side coordinated with the cutting elements (53) is provided with receiving grooves (123) for the cutting elements (53) that follow the dough piece contour.

20. The device in accordance with claim 18, wherein the drive mechanism is provided with an actuating mechanism (19) directed toward the line of dough, and a return mechanism (69) directed opposite thereto and counteracting it, to each of which the cutting elements (53) of the cutting tool (21, 53, 137) are connected, with a return path (G) triggered for the cutting elements (53) by the return mechanism (69) being of such dimensions that the cutting elements (53) come out of positive contact with the bench, but the cutting tool (21, 53, 137) with the cut-out dough pieces (147) remains in frictional engagement and sliding contact with the bench.

21. The device in accordance with claim 17, wherein the bed (33) comprises at least one conveyor belt (129, 131) whose transport path is controlled and regulated by the drive mechanism and control means as a function of the position of the cutting tool (21, 53, 137).

22. The device in accordance with claim 21, wherein the bed comprises at least two conveyor belts (129, 131) in succession in a direction of dough transport (9), the first (129) of the conveyor belts being coordinated with the cutting process (W, W1) and the second (131) of the conveyor belts being coordinated with the dough piece delivery process (2).

23. The device in accordance with claim 17, wherein the guide means (5, D, 61) include a linear guide (5) running from the end of the line of dough (143) parallel to a direction of transport (9) to a dough piece delivery location (Z), in which is mounted a carriage (11) that is adapted to be moved back and forth and that supports the cutting tool (21, 53, 137), and a pivot bearing (D, 103) located on the carriage (11) to which the cutting tool (21, 53, 137) is attached with rotating capability (145,146), and the drive mechanism (15, 19) comprises a linear drive module (15) adapted to move the carriage (11), and a rotary drive module for rotating the cutting tool (21, 53, 137), said drive mechanism and said linear drive module being connected to the control means for their coordination and synchronization.

24. The device in accordance with claim 23, wherein the rotary drive module comprises a turntable (39) that is rotationally connected to the cutting tool (21, 53, 137) and is provided with driver elements (43a, 43b) with coordinated counter-driver elements (41a, 41b) for interlocked engagement coupling.

25. The device in accordance with claim 23, wherein the rotary drive module comprises a rotary motor that is coordinated and synchronized with the linear drive module (15) through the control means.

26. The device in accordance with claim 17, the cutting tool comprising a punching tool having a first mounting provided with cutting elements (53) with a dough piece contour, and a second mounting provided with dough-ejecting and holding elements (75), with the two mountings (55, 57) being connected with adjustment capability relative to one another in a punching stroke direction (59), and with the dough-ejecting and holding elements (75) being located adjacent to the cutting elements (53) and able to slide on the cutting elements with a displacement stroke that extends on both sides of a cutting edge of the cutting element (53).

27. The device in accordance with claim 26, wherein one or more posts (61) connect the two mountings (55, 57), some of said posts being connected at one end to one of the two mountings and some of said posts being connected at one end to the other of the two mountings (55, 57) and being movable through the other mounting (55, 57) in each case in a punching stroke direction (59), and having at least one of the dough-ejecting and holding elements (75) and spring elements (69) at their other end, with the spring elements (69) being supported against the adjacent face of the mounting.

* * * * *